Patented Feb. 28, 1950

2,499,215

UNITED STATES PATENT OFFICE 2,499,215

QUATERNARY AMMONIUM DERIVATIVES FROM HALOMETHYLATED POLYMERS OF 3,5-DIMETHYLPHENYL ETHERS

Peter L. de Benneville, Philadelphia, and Louis H. Bock, Huntingdon Valley, Pa., assignors to Röhm & Haas Company, Philadelphia, Pa., a corporation of Delaware No Drawing. Application August 19, 1947, Serial No. 769,530

6 Claims. (Cl. 260—52)

This invention deals with polymeric quaternary ammonium compounds which serve as cationic soaps when they contain a long-chained substituent and as modifying agents for cellulose. These new compounds are characterized by phenyl nuclei joined through methylene bridges, by the presence in the phenyl nuclei of ether groups and of two methyl groups in the 3- and 5-positions with reference to the ether group, and by the presence of sufficient quaternary ammonium methylene groups to render the compounds at least water-dispersible. This particular type of structure imparts considerable reactivity to these compounds for combining with cellulose at its hydroxyl groups, thus modifying its properties.

The polymeric quaternary ammonium compounds of this invention are prepared by reacting an ether of 3,5-xylenol with formaldehyde in the presence of an acid catalyst to form a soluble resinous product, halomethylating said product by reacting it with formaldehyde together with an excess of a hydrohalide, and reacting the resulting halomethylated material with a tertiary amine. The final products contain two to five 3,5-dimethylphenyl ether units joined through methylene bridges. While these products appear to have primarily a chain formation, cross-linking is also apt to occur. Nevertheless, it is possible to render them dispersible in water by introducing quaternary ammonium methyl groups.

As ethers of 3,5-dimethylphenol, or 3,5-xylenol, there may be used any of the ethers formed with aliphatic groups of straight- or branched-chain, saturated or unsaturated. There may also be used aralkyl ethers, such as the benzyl, methylbenzyl, or butylbenzyl ethers. Typical aliphatic ether-forming groups are methyl, ethyl, propyl, butyl, hexyl, octyl, dodecyl, cetyl, and octadecyl and isomers and homologues thereof, including such groups as isobutyl, sec.-butyl, 2-ethylhexyl, capryl, isononyl, 1-methyl-4-ethyloctyl, 1-sec.-butyl-4-ethyloctyl, and 1-methyl-4-ethylhexyl, 2,2,4-trimethylhexyl, and 2,2,4-trimethylpentyl. Unsaturated ether groups include allyl, methallyl, crotyl, undecenyl, and octadecenyl. Mixtures of ethers of 3,5-dimethylphenol and of alcohols corresponding to the above groups may be used for the condensation with formaldehyde under the influence of an acid catalyst. Similarly, one or more such ethers may be used in conjunction with a 3,5-dimethylphenyl ether which contains as a substituent of the phenyl ring an alkyl or aliphatic acyl group of one to eighteen carbon atoms. An acyl group, such as acetyl, propionyl, butyryl, hexoyl, octanoyl, dodecanoyl, or stearoyl may be introduced by the Friedel-Crafts reaction, as with aluminum chloride. The acyl group may be reduced to a corresponding alkyl group.

The formation of soluble condensates from phenols is well known. In the presence of an acid catalyst, such as hydrochloric, sulfuric, trichloroacetic, oxalic, or citric, the 3,5-xylenyl ethers react with formaldehyde, supplied from an aqueous solution thereof or a revertible polymer thereof, to give soluble resins. The condensation is usually performed at 90° C. to 150° C. Water is taken off either during or after the condensation, which, if desired, may be conducted in the presence of a solvent such as naphtha, benzene, or toluene. The soluble resin is readily obtained upon removal of the solvent or the resin may be reacted in the next step in the solvent.

The organic solvent-soluble condensate is halomethylated by reacting it with formaldehyde and an excess of a hydrogen halide. Instead of formaldehyde itself, there may be used a revertible polymer, such as alpha-trioxymethylene, or other compound readily yielding formaldehyde, such as dichloromethyl ether or a formal, dimethyl formal and diethyl formal being typical examples thereof. The temperature of the reacting mixture may be carried from room temperature (25° C.) up to 100° C. An acidic catalyst may be used, such as zinc chloride, chlorosulfonic acid, or sulfuric acid. Halomethylation is desirably carried out in the presence of an inert solvent, such as a hydrocarbon solvent or a chlorinated organic solvent.

For the conversion of the halomethylated product to a quaternary ammonium salt, it is reacted with a tertiary amine, either directly or preferably in an organic solvent, such as benzene, toluene, xylene, ethylene dichloride, nitromethane, ethyl acetate, naphtha, or the like. The reaction is most readily effected by heating under reflux. Temperatures of 50° C. to 150° C. may be used.

Suitable tertiary amines include pyridine, methyl pyridine, N-methylmorpholine, trimethylamine, benzyldimethylamine, benzyldiethylamine, triethylamine, allyldimethylamine, ethyldimethylamine, methallyldimethylamine, etc.

An alternative method for producing a quaternary ammonium salt is to react the halomethylated condensate with a secondary amine and then to react the product thus obtained with an alkylating agent, such as methyl iodide, ethyl bromide, ethyl sulfate, allyl or methallyl chloride or bromide, benzyl chloride, or the like. This alternative procedure offers a means of varying the nature of the N-substituents and the anion over a considerable range.

By such reactions there is formed as a phenyl substituent a quaternary ammonium methyl or methylene group

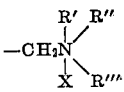

where X is an anion, usually a halogen; R' represents an individual group such as methyl, ethyl, allyl, methallyl, or benzyl; R'' and R''' represent a methyl or ethyl group when taken individually or R'' and R''', taken together, represent a divalent saturated aliphatic chain of four to five atoms selected from hydrocarbon chains and ether chains, which jointly with the nitrogen form a heterocycle; and R', R'', and R''', taken together, represent a trivalent, unsaturated chain which jointly with the nitrogen forms a heterocycle. Typical heterocycles are those from morpholine, pyrrolidine, piperidine, pyridine, picoline, and the like.

The number of quaternary ammonium methyl groups which are introduced varies with the particular 3,5-xylenyl ethers which are selected for reaction and the extent of condensation to which they are subjected. In any case sufficient such groups are introduced to impart water-dispersibility to the final product. This number varies from 0.5 to one per phenyl nucleus. The usual number of such groups will fall somewhere between these limits.

As typical preparations of the polymeric quaternary ammonium compounds of this invention, there are given the following examples.

EXAMPLE 1

*Benzyldimethylamine quaternary salt of chloromethylated 3,5-dimethylanisole - formaldehyde polymer*

A mixture of 68 parts of 3,5-dimethylanisole, 20 parts of paraformaldehyde, and 1 part of concentrated sulfuric acid in 110 parts of benzene was heated and stirred under reflux for three hours with separation of the water formed during the reaction. There was collected 12 parts of water in the separator. Water and a little benzene for washing were added. The benzene was then removed in vacuo on the steam-bath from the resulting emulsion, leaving a solid resin which was removed by filtration, ground up with a little concentrated hydrochloric acid to remove formaldehyde, washed and dried in air. There were obtained 71 parts of a straw-colored powdered resin, having an average molecular weight of 601±10. This corresponds to about four units of 3,5-dimethylanisole linked with methylene chains.

Hydrogen chloride gas was passed into a mixture of 50 parts of the above polymeric ether, 15 parts of paraformaldehyde, 60 parts of concentrated hydrochloric acid and 65 parts of ethylene chloride, at reflux for twelve hours. The mixture was diluted with water and the organic layer was separated and evaporated to dryness. There were obtained 52 parts of a light-brown, easily pulverized resin. Analysis showed chlorine 13.3%, corresponding to about 0.75 $CH_2Cl$ group per ether unit. Molecular weight was determined to be 874±10.

To a solution of 20.5 parts of the chloromethylated product above-described in 100 parts of benzene was rapidly added 13.5 parts of benzyldimethylamine at reflux. Refluxing was continued for three hours. The quaternary salt precipitated as a soft resin, easily removed from the flask. The benzene was poured off and the resin was removed and ground under dry ether, filtered and dried in vacuo. There were thus obtained 27 parts of the light tan quaternary salt, quite soluble in hot water. Chlorine analysis showed 7.43%.

EXAMPLE 2

*Benzyldimethylamine quaternary salt of chloromethylated 3,5-dimethylphenyl dodecyl ether-formaldehyde polymer*

A mixture of 100 parts of 3,5-dimethylphenyl dodecyl ether, 17.3 parts of paraformaldehyde and 1 part of concentrated sulfuric acid in 110 parts of benzene was refluxed for three and one-half hours with separation of the water formed during reaction. The benzene layer was washed carefully with water. The product produced an emulsion which had to be broken by complete evaporation in vacuo. There were obtained 98 parts of a thick orange-colored oil, having an average molecular weight of 1075±25. This corresponds to an average of 3.5 ether units per molecule.

Hydrogen chloride gas was passed for twelve hours under reflux into a mixture of 65 parts of the above ether, 7.5 parts of formaldehyde, 75 parts of concentrated hydrochloric acid, and 80 parts of ethylene dichloride. The water, ethylene dichloride, and hydrochloric acid were stripped off in vacuo, yielding 69 parts of a very thick, brown oil which on analysis showed Cl, 6.45%.

A mixture of 40 parts of the above chloromethylation product, 10 parts of benzyldimethylamine, 40 parts of acetonitrile, and 17 parts of benzene was stirred at room temperature about 10 hours and allowed to stand overnight. The solvents were removed in vacuo at room temperature, yielding 50 parts of a straw-colored resin having poor water-solubility but dispersing readily in hot water. Analysis showed 4.74% ionizable chlorine.

EXAMPLE 3

*Benzyldimethylamine quaternary salt of chloromethylated 3,5 - dimethylphenyl octadecyl ether-formaldehyde polymer*

A mixture of 100 parts of 3,5-dimethylphenyl octadecyl ether, 16.6 parts of paraformaldehyde, and 2 parts of concentrated sulfuric acid in 175 parts of benzene was refluxed, using a water separator, for seven hours. Most of the excess formaldehyde distilled out into the condenser and separator. The benzene solution was well-washed with water and the resulting emulsion evaporated to dryness by heating on the water-bath in vacuo. There remained 90 parts of a thick, brownish oil, having an average molecular weight of 1885±10. This corresponds to approximately 4.5 units of the original ether joined by methylene bridges.

Hydrogen chloride gas was passed for 20 hours under reflux into a mixture of 65 parts of the above polymeric ether, 6 parts of paraformaldehyde, 75 parts of concentrated hydrochloric acid, 75 parts of ethylene dichloride, and 65 parts of glacial acetic acid. The ethylene dichloride layer was washed with water and the solvent removed by evaporation on the steam-bath in vacuo. There remained 66 parts of a brown oil solidifying to a waxy solid. Analysis showed 6.37% chlorine.

A mixture of 40 parts of the above chloromethylation product, 10 parts of benzyldimethylamine, 40 parts of acetonitrile, and 20 parts of benzene was stirred at room temperature 24 hours, allowed to stand overnight and transferred to a vacuum dish by the use of solvent benzene. All solvents were removed in vacuo at room temperature. There remained 46 parts of a straw-colored resin, which had very poor water-solubility. Analysis showed 3.72% ionizable chlorine.

In place of the methyl, dodecyl, or octadecyl ethers shown, there may be used in the same way ethyl, butyl, hexyl, octyl, or decyl ethers with the same result and the preparation of similar compounds. When the ether is formed with amyl or larger groups, the solutions of the compounds are capillary active. The compounds are effective as cation-active soaps, wetting agents, emulsifiers, and dispersing agents. The compounds are also useful as textile finishing agents, particularly in conjunction with cellulosic products, such as cotton, linen, ramie, jute, sisal, and rayon. When cellulosic materials are impregnated with solutions of the compounds of this invention, dried, and heated at temperatures of 200° F. to 350° F., they combine chemically therewith. This reaction changes the water-absorbency of the cellulose, imparting water-repellency thereto when a long-chained substituent is present, stabilizing the treated material against changes in dimension during washing and handling, and altering the handle and the dyeing properties.

We claim:

1. As new chemical compounds, acid-catalyzed condensates from ethers of 3,5-dimethylphenol and monohydric aliphatic alcohols, ROH, and formaldehyde, R being a hydrocarbon group, said condensate having two to five phenyl ether groups per molecule connected by methylene bridges, said phenyl groups also being substituted with sufficient quaternary ammonium methylene groups to render the compounds dispersible in water, said groups being of the structure

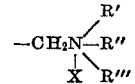

wherein X is a halogen, R' is a member of the class consisting of methyl and benzyl groups, and R'' and R''' are methyl groups.

2. As new chemical compounds, acid-catalyzed condensates of formaldehyde and ethers of 3,5-dimethylphenol and monohydric aliphatic alcohols of the formula ROH, R being a hydrocarbon group of one to eighteen carbon atoms, wherein there are two to five phenyl ether groups linked by methylene groups and there are present as phenyl substituents in a sufficient proportion to impart water-dispersibility to the compound quaternary ammonium methyl groups of the formula

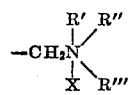

wherein X is chlorine, R' is a benzyl group, and R'' and R''' are methyl groups.

3. The compounds of claim 2 wherein the ether is derived from 3,5-dimethylphenol and a monohydric saturated aliphatic alcohol of the formula ROH, R being an alkyl group having five to eighteen carbon atoms.

4. The compounds of claim 3 wherein octadecyl alcohol is the aliphatic alcohol.

5. The compounds of claim 3 wherein dodecyl alcohol is the aliphatic alcohol.

6. The compounds of claim 2 wherein methyl alcohol is the aliphatic alcohol.

PETER L. DE BENNEVILLE.
LOUIS H. BOCK.

REFERENCES CITED

The following references are of record in the file of this patent:

UNITED STATES PATENTS

| Number | Name | Date |
| --- | --- | --- |
| 2,003,291 | Hill | June 4, 1935 |
| 2,405,806 | Albrecht et al. | Aug. 13, 1946 |